(12) United States Patent
Hochi et al.

(10) Patent No.: US 8,293,833 B2
(45) Date of Patent: Oct. 23, 2012

(54) RUBBER COMPOSITION AND TIRE HAVING TREAD AND/OR SIDEWALL USING SAME

(75) Inventors: Kazuo Hochi, Kobe (JP); Ai Matsuura, Kobe (JP); Yasuhisa Minagawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 242 days.

(21) Appl. No.: 11/822,620

(22) Filed: Jul. 9, 2007

(65) Prior Publication Data
US 2008/0027166 A1 Jan. 31, 2008

(30) Foreign Application Priority Data
Jul. 26, 2006 (JP) .................................. 2006-203429

(51) Int. Cl.
*B60C 1/00* (2006.01)
*C08K 3/34* (2006.01)

(52) U.S. Cl. ........................................ 524/493; 524/492

(58) Field of Classification Search .................. 524/493, 524/492
See application file for complete search history.

(56) References Cited

U.S. PATENT DOCUMENTS

| 6,225,397 | B1 | 5/2001 | Materne et al. |
| 6,506,829 | B1 * | 1/2003 | Materne et al. ............... 524/493 |
| 2004/0016495 | A1 * | 1/2004 | Serra et al. .................... 152/525 |
| 2005/0228107 | A1 * | 10/2005 | Lin et al. ....................... 524/492 |

FOREIGN PATENT DOCUMENTS

| EP | 0-942-029 A2 | 9/1999 |
| JP | 11-323027 | 11/1999 |
| JP | 2003-192842 A | 7/2003 |
| JP | 2005-281384 A | 10/2005 |
| JP | 2006-182940 A | 7/2006 |
| JP | 2007-238803 | 9/2007 |

* cited by examiner

*Primary Examiner* — Mark Eashoo
*Assistant Examiner* — Angela C Scott
(74) *Attorney, Agent, or Firm* — Birch, Stewart, Kolasch & Birch LLP

(57) ABSTRACT

The present invention provides a rubber composition capable of reducing rolling resistance, and improving abrasion resistance, wet skid performance, and steering stability. A tire having a tread and/or a sidewall using the rubber composition is also provided. The rubber composition of the present invention comprises not less than 10 parts by weight of the silica (1) having an average primary particle diameter of not less than 22 nm and not less than 5 parts by weight of the silica (2) having an average primary particle diameter smaller than 22 nm based on 100 parts by weight of a rubber component, wherein the total amount of the silica (1) and the silica (2) is 15 to 150 parts by weight. The tire of the present invention is prepared by using the rubber composition.

7 Claims, No Drawings

RUBBER COMPOSITION AND TIRE HAVING TREAD AND/OR SIDEWALL USING SAME

BACKGROUND OF THE INVENTION

The present invention relates to a rubber composition and a tire having a tread and/or a sidewall prepared using the rubber composition.

So far, reduction of rolling resistance of tires (i.e., enhancement of rolling resistance property) has contributed to low fuel consumption of vehicles. In recent years, in response to the increasing demands for low fuel consumption of vehicles, rubber compositions for forming a tread and/or a sidewall occupying a large portion of a tire among tire members are required to possess a notably low heat build-up property.

For enhancement of a low heat build-up property of a rubber composition, a method of reducing the content of reinforcing fillers is known. However, in this case, hardness of the rubber composition is lowered and thus a tire produced using the rubber composition becomes soft, which causes a problem that handling performance (steering stability) and wet skid performance of vehicles, and abrasion resistance are deteriorated.

JP2003-192842A discloses a rubber composition for a tire containing both of anhydrous silica and hydrous silica to improve wet skid performance. The rubber composition, however, still has a problem that rolling resistance property is not improved sufficiently.

An object of the present invention is to provide a rubber composition capable of reducing rolling resistance, and enhancing abrasion resistance, wet skid performance, and steering stability. Another object of the present invention is to provide a tire having a tread and/or a sidewall prepared using the rubber composition.

SUMMARY OF THE INVENTION

The present invention relates to a rubber composition which comprises not less than 10 parts by weight of a silica (1) having an average primary particle diameter of not less than 22 nm and not less than 5 parts by weight of a silica (2) having an average primary particle diameter of less than 22 nm based on 100 parts by weight of a rubber component, in which the total amount of the silica (1) and the silica (2) is 15 to 150 parts by weight.

It is preferable that the average primary particle diameter of the silica (1) and that of the silica (2) satisfy the following general formula:

(average primary particle diameter of silica(1))/(average primary particle diameter of silica(2))≧1.4.

A content of the silica (1) in the total silica is preferably 10 to 35% by weight.

It is preferable that an amount of the silica (1) and an amount of the silica (2) satisfy the following general formula:

(amount of silica(1))×0.03≦(amount of silica(2))≦ (amount of silica(1))×14.

The present invention also relates to a tire having a tread and/or a sidewall prepared using the rubber composition.

DETAILED DESCRIPTION

The rubber composition of the present invention comprises the rubber component, the silica (1) having an average primary particle diameter of not less than 22 nm (hereinafter referred to as the silica (1)), and the silica (2) having an average primary particle diameter of less than 22 nm (hereinafter referred to as the silica (2)).

The rubber component is preferably a diene rubber. Examples of the diene rubber are a natural rubber (NR), isoprene rubber (IR), butadiene rubber (BR), styrene-butadiene rubber (SBR), acrylonitrile-butadiene rubber (NBR), chloroprene rubber (CR), butyl rubber (IIR), halogenated butyl rubber (X-IIR), and styrene-isoprene-butadiene rubber (SIBR). These diene rubbers may be used alone or two or more kinds thereof may be used in combination. Among them, at least one kind of rubber selected from the group consisting of NR, BR, and SBR is preferable due to their capabilities of reducing rolling resistance and enhancing abrasion resistance and wet skid performance. When the rubber composition is used for a tread, SBR is preferable from the viewpoint of excellent grip performance. When the rubber composition is used for a sidewall, it is preferable to use NR and BR together from the viewpoint of excellent flex crack growth resistance.

Examples of the silica are, for instance, one prepared through a dry process (silicic acid anhydride) and one prepared through a wet process (silicic acid hydrate). In the present invention, both of the silica (1) and the silica (2) are preferably silica prepared by the wet process since rubber strength and grip performance are excellent due to a large number of silanol groups.

The average primary particle diameter of the silica (1) is not less than 22 nm, preferably not less than 25 nm. In the case where the average primary particle diameter of the silica (1) is less than 22 nm, the difference in a diameter from the silica (2) becomes smaller and effects obtained by mixing two kinds of silica cannot be obtained, for example, low heat build-up property and processability of a rubber are deteriorated and abrasion resistance cannot be obtained. At the same time, the average primary particle diameter of the silica (1) is preferably not more than 50 nm, more preferably not more than 40 nm. In the case where the average primary particle diameter of the silica (1) is larger than 50 nm, strength at break of tends to decrease significantly. The average primary particle diameter of the silica (1) can be determined by measuring particle diameters of randomly selected 50 silica particles by observing with an electron microscope and then calculating an average of the measured values.

An amount of the silica (1) is not less than 10 parts by weight, preferably not less than 15 parts by weight based on 100 parts by weight of the rubber component. In the case where the amount of the silica (1) is less than 10 parts by weight, rolling resistance cannot be decreased sufficiently. At the same time, the amount of the silica (1) is preferably not more than 145 parts by weight, more preferably not more than 80 parts by weight. In the case where the amount of the silica (1) is more than 145 parts by weight, there is a tendency that strength at break is significantly decreased.

The average primary particle diameter of the silica (2) is less than 22 nm, preferably less than 18 nm, more preferably less than 16 nm. In the case where the average primary particle diameter of the silica (2) is 22 nm or more, the difference in a diameter from the silica (1) becomes smaller and effects obtained by mixing two kinds of silica cannot be obtained, for example, a low heat build-up property and processability of a rubber are deteriorated and abrasion resistance cannot be obtained. At the same time, the average primary particle diameter of the silica (2) is preferably not less than 5 nm, more preferably not less than 10 nm. In the case where the average primary particle diameter of the silica (2) is less than 5 nm, abrasion resistance tends to be deteriorated because dispersion of the silica in the rubber becomes very difficult. The average primary particle diameter of the silica (2) can be determined in the same manner as in the case of the silica (1).

An amount of the silica (2) is not less than 5 parts by weight, preferably not less than 10 parts by weight based on 100 parts by weight of the rubber component. In the case where the amount of the silica (2) is less than 5 parts by weight, sufficient strength cannot be obtained. At the same time, the amount of the silica (2) is preferably not more than 140 parts by weight, more preferably not more than 80 parts by weight. In the case where the amount of the silica (2) is more than 140 parts by weight, there is a tendency that kneading becomes difficult and abrasion resistance is largely deteriorated.

The total amount of the silica (1) and the silica (2) is not less than 15 parts by weight, preferably not less than 40 parts by weight, more preferably not less than 60 parts by weight based on 100 parts by weight of the rubber component. In the case where the total amount of the silica (1) and the silica (2) is less than 15 parts by weight, a reinforcing effect obtained by the addition of the silica (1) and the silica (2) is insufficient. At the same time, the total amount of the silica (1) and the silica (2) is not more than 150 parts by weight, preferably not more than 120 parts by weight, more preferably not more than 100 parts by weight. In the case where the total amount of the silica (1) and the silica (2) is more than 150 parts by weight, it becomes difficult to disperse silica evenly in the rubber composition, resulting in deterioration of processability of the rubber composition.

It is preferable that the average primary particle diameters of the silica (1) and the silica (2) satisfy the following general formula:

(average primary particle diameter of the silica(1)/ (average primary particle diameter of the silica (2))≧1.4 from the viewpoint of effects obtained by blending two kinds of silica, for example, excellent low heat build-up property, processability of a rubber, and abrasion resistance.

The average primary particle diameter of the silica (1) is preferably not less than 1.4 times that of the silica (2), more preferably not less than 2.0 times that of the silica (2). In the case where the average primary particle diameter of the silica (1) is smaller than 1.4 times that of the silica (2), the difference in the average primary particle diameter between the silica (1) and the silica (2) becomes smaller and therefore, effects obtained by blending two kinds of silica cannot be exhibited, for example, a low heat build-up property and processability of the rubber are deteriorated and sufficient abrasion resistance tends not to be obtained.

A content of the silica (1) in the total silica is preferably not less than 10% by weight, more preferably not less than 15% by weight. In the case where the content of the silica (1) is less than 10% by weight, there is a tendency that rolling resistance cannot be decreased sufficiently. At the same time, the content of the silica (1) is preferably not more than 35% by weight, more preferably not more than 30% by weight. In the case where the content of the silica (1) is more than 35% by weight, strength at break tends to be largely deteriorated.

It is preferable that the amounts of the silica (1) and the silica (2) satisfy the following general formula:

(amount of the silica(1))×0.03≦(amount of the silica (2))≦(amount of the silica(1))×14

The amount of the silica (2) is preferably not less than 0.03 times that of the silica (1), more preferably not less than 0.15 times that of the silica (1), further preferably not less than 0.25 times that of the silica (1). In the case where the amount of the silica (2) is less than 0.03 times that of the silica (1), steering stability tends to be decreased. At the same time, the amount of the silica (2) is preferably not more than 14 times that of the silica (1), more preferably not more than 7 times that of the silica (1), further preferably not more than 4 times that of the silica (1). In the case where the amount of the silica (2) is more than 14 times that of the silica (1), rolling resistance tends to increase.

The rubber composition of the present invention preferably comprises a silane coupling agent together with the silica (1) and the silica (2).

Examples of the silane coupling agent suitably used in the present invention are silane coupling agents which have been used together with silica, for instance, sulfide silane coupling agents such as bis(3-triethoxysilylpropyl)tetrasulfide, bis(2-triethoxysilylethyl) tetrasulfide, bis(4-triethoxysilylbutyl) tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropylmethacrylatemonosulfide, and 3-trimethoxysilylpropylmethacrylatemonosulfide, mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane, vinyl silane coupling agents such as vinyltriethoxysilane and vinyltrimethoxysilane, amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane, glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane, nitro silane coupling agents such as 3-nitropropyltrimethoxysilane and 3-nitropropyltriethoxysilane, and chloro silane coupling agents such as 3-chloropropyltrimethoxysilane, 3-chloropropyltriethoxysilane, 2-chloroethyltrimethoxysilane, and 2-chloroethyltriethoxysilane.

An amount of the silane coupling agent is preferably not less than 5 parts by weight, more preferably not less than 8 parts by weight based on of 100 parts by weight of the total amount of the silica (1) and the silica (2). In the case where the amount of the silane coupling agent is less than 5 parts by weight, strength at break tends to be largely decreased. At the same time, the amount of the silane coupling agent is preferably not more than 15 parts by weight, more preferably not more than 10 parts by weight. In the case where the amount of the silane coupling agent is more than 15 parts by weight, there is a tendency that effects of blending the silane coupling agent such as enhancement of strength at break and reduction of rolling resistance cannot be obtained.

In addition to the aforementioned rubber component, the silica (1), the silica (2), and the silane coupling agent, the rubber composition of the present invention may further comprise compounding agents that are generally used for preparation of a rubber composition, for example, a reinforcing filler such as a carbon black and clay, an antioxidant, zinc oxide, stearic acid, aromatic oil, wax, a vulcanizing agent such as sulfur, and a vulcanization accelerator in usual amounts as needed.

The rubber composition of the present invention is preferably used for a tread and/or a sidewall.

The tire of the present invention is prepared in a known manner using the rubber composition for a tread and/or a sidewall. More specifically, the rubber composition is extruded and processed into a shape of a tread or a sidewall of a tire in an unvulcanized state and then are laminated with other tire members on a tire molding machine to prepare an unvulcanized tire in a known manner. Finally, the unvulcanized tire is heated and pressed in a vulcanizer to obtain the tire of the present invention.

EXAMPLES

Hereinafter, the present invention will be explained in detail based on Examples, but it should be understood that the present invention is not limited thereto.

Various chemicals used in Examples and Comparative Examples will be collectively explained below.

Natural rubber (NR): RSS#3
Styrene-butadiene rubber (SBR) (1): HPR350 available from JSR Corporation
SBR (2): E60 (37.5 parts by weight of oil content based on 100 parts by weight of solid content of rubber) available from Asahi Kasei Chemicals Corp.
Butadiene rubber (BR): Nipol BR1220 available from ZEON Corporation
Carbon black: SEAST NH available from Tokai Carbon Co., Ltd.
Silica (1): ULTRASIL 360 (average primary particle diameter: 28 nm) available from Degussa GmbH
Silica (2-1): CARPLEX#67 (average primary particle diameter: 14 nm) available from Degussa GmbH
Silica (2-2): ZEOSIL 115GR (average primary particle diameter: 20 nm) available from Rhodia Japan, Ltd.
Silica (2-3): ULTRASIL VN3 (average primary particle diameter: 15 nm) available from Degussa GmbH
Silane coupling agent (1): Si69 (bis(3-triethoxysilylpropyl)tetrasulfide) available from Degussa GmbH
Silane coupling agent (2): Si75 (bis(3-triethoxysilylpropyl)disulfide) available from Degussa-Huls AG.
Zinc oxide: Zinc oxide No. 1 available from Mitsui Mining & Smelting Co., Ltd.
Stearic acid: Stearic acid "Tsubaki" available from NOF Corporation.
Aromatic oil: Process X-140 available from Japan Energy Corporation
Antioxidant: Antigen 6C (N-(1,3-dimethylbutyl)-N'-phenyl-p-phenylenediamine) available from Sumitomo Chemical Co., Ltd.
Wax: SANNOC N available from Ouchi Shinko Chemical Industrial Co., Ltd.
Sulfur (1): Sanfel EX available from Sanshin Chemical Industry Co., Ltd.
Sulfur (2): Powder sulfur available from Karuizawa Iou Kabushiki. Kaisha.
Vulcanization accelerator (1): NOCCELER NS (N-tert-butyl-2-benzothiazolylsulfenamide) available from Ouchi Shinko Chemical Industrial Co., Ltd.
Vulcanization accelerator (2): NOCCELER D (N,N'-diphenylguanidine) available from Ouchi Shinko Chemical Industrial Co., Ltd.
Vulcanization accelerator (3): NOCCELER CZ (N-cyclohexyl-2-benzothiazolylsulfenamide) available from Ouchi Shinko Chemical Industrial Co., Ltd.

Examples 1 to 10 and Comparative Examples 1 to 6

In accordance with the compounding prescriptions shown in Table 1, the chemicals other than sulfur and the vulcanization accelerators were kneaded in a Banbury mixer for 4 minutes to prepare kneaded products. Then, sulfur and the vulcanization accelerators were added to the obtained kneaded products and the respective products were kneaded in an open roll for 4 minutes to prepare unvulcanized rubber compositions. Each of the unvulcanized rubber compositions was press-vulcanized under the condition of 170° C. for 12 minutes to prepare vulcanized rubber sheets of Examples 1 to 10 and Comparative Examples 1 to 6.

(Viscoelasticity Test)

Using a viscoelasticity spectrometer manufactured by Iwamoto Seisakusho Kabushiki Kaisha, loss tangent (tan δ) of each of the vulcanized rubber sheets were measured at 30° C. under the conditions of a frequency of 10 Hz, an initial strain of 10%, and a dynamic strain of 2%. Assigning a reference index of 100 to a low heat build-up property index of Comparative Example 1, tan δ of each rubber composition was expressed by an index based on the following equation. The larger the value of the heat build-up property index is, the smaller the amount of heat generation is and the more favorable the low heat build-up property is.

(Low heat build-up property index)=(tan δ of Comparative Example 1)/(tan δ of each of rubber compositions)×100

(Abrasion Resistance)

Using a Lambourn abrasion tester, a Lambourn abrasion amount of each of the rubber compositions was measured under the conditions of a temperature of 20° C., a slip ratio of 20% and a test time of 2 minutes. Then, assigning a reference index of 100 to the Lambourn abrasion amount of Comparative Example 1, a volume loss calculated based on the measured Lambourn abrasion amount of each of the rubber compositions was expressed by an index based on the following equation. The larger the Lambourn abrasion index is, the superior the abrasion resistance is.

(Lambourn abrasion index)=(Volume loss of Comparative Example 1)/(Volume loss of each of rubber compositions)×100

Evaluation results of Examples 1 to 10 and Comparative Examples 1 to 6 are shown in Tables 1 to 3.

TABLE 1

| | Ex. | | | | Com. Ex. | |
| --- | --- | --- | --- | --- | --- | --- |
| | 1 | 2 | 3 | 4 | 1 | 2 |
| Amounts (part by weight) | | | | | | |
| NR | 30 | 30 | 30 | 30 | 30 | 30 |
| SBR (1) | 70 | 70 | 70 | 70 | 70 | 70 |
| Silica (1) | 15 | 10 | 22.5 | 15 | 45 | 4 |
| Silica (2-1) | 30 | 35 | 22.5 | — | — | 41 |
| Silica (2-2) | — | — | — | 30 | — | — |
| Silane coupling agent (1) | 4 | 4 | 4 | 4 | 4 | 4 |
| Zinc oxide | 3 | 3 | 3 | 3 | 3 | 3 |
| Stearic acid | 2 | 2 | 2 | 2 | 2 | 2 |

TABLE 1-continued

|  | Ex. | | | | Com. Ex. | |
| --- | --- | --- | --- | --- | --- | --- |
|  | 1 | 2 | 3 | 4 | 1 | 2 |
| Aromatic oil | 5 | 5 | 5 | 5 | 5 | 5 |
| Antioxidant | 2 | 2 | 2 | 2 | 2 | 2 |
| Wax | 2 | 2 | 2 | 2 | 2 | 2 |
| Sulfur (1) | 2 | 2 | 2 | 2 | 2 | 2 |
| Vulcanization accelerator (1) | 1 | 1 | 1 | 1 | 1 | 1 |
| Vulcanization accelerator (2) | 0.5 | 0.5 | 0.5 | 0.5 | 0.5 | 0.5 |
| Evaluation Results |  |  |  |  |  |  |
| Low heat build-up property index | 100 | 100 | 101 | 103 | 100 | 87 |
| Lambourn abrasion index | 117 | 120 | 110 | 115 | 100 | 130 |

TABLE 2

|  | Ex. | | | Com. Ex. | |
| --- | --- | --- | --- | --- | --- |
|  | 5 | 6 | 7 | 3 | 4 |
| Amounts (part by weight) |  |  |  |  |  |
| NR | 30 | 30 | 30 | 30 | 30 |
| SBR (1) | 70 | 70 | 70 | 70 | 70 |
| Silica (1) | 35 | 75 | 55 | 110 | — |
| Silica (2-1) | 75 | 35 | 55 | — | 110 |
| Silane coupling agent (1) | 4 | 4 | 4 | 4 | 4 |
| Zinc oxide | 3 | 3 | 3 | 3 | 3 |
| Stearic acid | 2 | 2 | 2 | 2 | 2 |
| Aromatic oil | 20 | 20 | 20 | 20 | 20 |
| Antioxidant | 2 | 2 | 2 | 2 | 2 |
| Wax | 2 | 2 | 2 | 2 | 2 |
| Sulfur (1) | 2 | 2 | 2 | 2 | 2 |
| Vulcanization accelerator (1) | 1 | 1 | 1 | 1 | 1 |
| Vulcanization accelerator (2) | 0.5 | 0.5 | 0.5 | 0.5 | 0.5 |
| Evaluation Results |  |  |  |  |  |
| Low heat build-up property index | 130 | 128 | 125 | 130 | 110 |
| Lambourn abrasion index | 128 | 125 | 127 | 120 | 133 |

TABLE 3

|  | Ex. | | | Com. Ex. | |
| --- | --- | --- | --- | --- | --- |
|  | 8 | 9 | 10 | 5 | 6 |
| Amounts (part by weight) |  |  |  |  |  |
| NR | 30 | 30 | 30 | 30 | 30 |
| SBR (1) | 70 | 70 | 70 | 70 | 70 |
| Silica (1) | 45 | 85 | 65 | 130 | — |
| Silica (2-1) | 85 | 45 | 65 | — | 130 |
| Silane coupling agent (1) | 4 | 4 | 4 | 4 | 4 |
| Zinc oxide | 3 | 3 | 3 | 3 | 3 |
| Stearic acid | 2 | 2 | 2 | 2 | 2 |
| Aromatic oil | 20 | 20 | 20 | 20 | 20 |
| Antioxidant | 2 | 2 | 2 | 2 | 2 |
| Wax | 2 | 2 | 2 | 2 | 2 |
| Sulfur (1) | 2 | 2 | 2 | 2 | 2 |
| Vulcanization accelerator (1) | 1 | 1 | 1 | 1 | 1 |
| Vulcanization accelerator (2) | 0.5 | 0.5 | 0.5 | 0.5 | 0.5 |
| Evaluation Results |  |  |  |  |  |
| Low heat build-up property index | 133 | 131 | 129 | 135 | 114 |
| Lambourn abrasion index | 131 | 126 | 127 | 125 | 137 |

Examples 11 to 15 and Comparative Examples 7 to 10

In accordance with the compounding prescriptions shown in Table 4, the chemicals other than sulfur and the vulcanization accelerators were kneaded in a Banbury mixer for 3 minutes to prepare kneaded products. Then, sulfur and the vulcanization accelerators were added to the obtained kneaded products and were kneaded in an open roll for 4 minutes to prepare unvulcanized rubber compositions. Each of the obtained unvulcanized rubber compositions was formed into a shape of a tread and was laminated with other tire members on a tire molding machine. The respective unvulcanized tires were press-vulcanized to prepare test tires (tire size: 195/65R15) of Examples 11 to 13 and Comparative Examples 7 and 8.

Also, in accordance with the compounding prescriptions shown in Table 5, test tires of Examples 14 and 15 and Comparative Examples 9 and 10 were produced in the same manner as in the case of Examples 11 to 13 and Comparative Examples 7 and 8 except that the unvulcanized rubber compositions were formed into a shape of a sidewall.

Sidewall parts of tires of Examples 11 and 12 and Comparative Examples 7 and 8 were prepared from the rubber composition of Comparative Example 9, and a sidewall part of the tire of Example 13 was prepared from the rubber composition of Example 14.

In the following evaluation test, Comparative Example 7 was selected to be the reference rubber composition for Examples 11 to 13 and Comparative Examples 7 and 8. Similarly, Comparative Example 9 was selected to be the reference rubber composition for Examples 14 and 15 and Comparative Examples 9 and 10.

(Rolling Resistance)

Using a rolling resistance tester, rolling resistance of the respective test tires was measured while running each of the tires under the conditions of nm of 15×6JJ, a tire inner pressure of 230 kPa, a load of 3.43 kN, and a speed of 80 km/hr. A rolling resistance index of the reference rubber composition was referred to as 100 and each of the rolling resistances of the other rubber compositions was expressed by an index based on the following equation. Comparative Example 7 was selected to be the reference rubber composition for Examples 11 to 13 and Comparative Examples 7 and 8, and Comparative Example 9 was selected to be the reference rubber composition for Examples 14 and 15 and Comparative Examples 9 and 10. The larger the rolling resistance index is, the more the rolling resistance is reduced and the more superior it is.

(Rolling resistance index)=(Rolling resistance of reference rubber composition)/(Rolling resistance of each of rubber compositions)×100

(Wet Skid Performance)

Four test tires were mounted on a test car (domestic FF car with 2,000 cc engine) and a braking distance, which is a distance that the test car running on a wet road paved with asphalt at 100 km/h traveled after the application of brake, was measured. Measurement of the braking distance was made as to each of the rubber compositions. Then, a wet skid performance index of the reference rubber composition was referred to as 100 and each of the braking distances of the other rubber compositions was expressed as an index based on the following equation. Comparative Example 7 was selected to be the reference rubber composition for Examples 11 to 13 and Comparative Examples 7 and 8. The larger the wet skid performance index is, the more superior the wet skid performance is.

(Wet skid performance index)=(Braking distance of reference rubber composition)/(Braking distance of each of rubber compositions)×100

(Steering Stability)

Four tires were mounted on a test car (domestic FF car with 2,000 cc engine) and in-vehicle running was conducted on a test course. While driving the test car, the driver implemented sensory evaluations of steering stability for each rubber composition. A score of 6 (on a scale up to 10) was given to steering stability of the reference rubber composition, and each of the other rubber compositions was scored by relative evaluation to the reference rubber composition. Comparative Example 7 was selected to be the reference rubber composition for Examples 11 to 13 and Comparative Examples 7 and 8, and Comparative Example 9 was selected to be the reference rubber composition for Examples 14 and 15 and Comparative Examples 9 and 10. The higher the score is, the more superior the steering stability is.

Evaluation results of Examples 11 to 15 and Comparative Examples 7 to 10 are shown in Tables 4 and 5.

TABLE 4

|  | Ex. | | | Com. Ex. | |
| --- | --- | --- | --- | --- | --- |
|  | 11 | 12 | 13 | 7 | 8 |
| Amounts (part by weight) Tread part | | | | | |
| SBR (2) | 137.5 | 137.5 | 137.5 | 137.5 | 137.5 |
| Silica (1) | 60 | 30 | 60 | — | 80 |
| Silica (2-3) | 30 | 60 | 30 | 80 | — |
| Silane coupling agent (2) | 6.6 | 7.8 | 6.6 | 8 | 4.8 |
| Zinc oxide | 3 | 3 | 3 | 3 | 3 |
| Stearic acid | 2 | 2 | 2 | 2 | 2 |
| Antioxidant | 2 | 2 | 2 | 2 | 2 |
| Wax | 2 | 2 | 2 | 2 | 2 |
| Sulfur (2) | 1.8 | 1.8 | 1.8 | 1.8 | 1.8 |
| Vulcanization accelerator (2) | 0.8 | 0.8 | 0.8 | 0.8 | 0.8 |
| Vulcanization accelerator (3) | 1.5 | 1.5 | 1.5 | 1.5 | 1.5 |
| Sidewall part rubber composition | Com. Ex. 9 | Com. Ex. 9 | Ex. 14 | Com. Ex. 9 | Com. Ex. 9 |
| Evaluation Results | | | | | |
| Rolling resistance index | 107 | 102 | 110 | 100 | 111 |
| Wet skid performance index | 101 | 100 | 101 | 100 | 98 |
| Steering stability | 6 | 6.5 | 6 | 6 | 5 |

TABLE 5

|  | Ex. | | Com. Ex. | |
| --- | --- | --- | --- | --- |
|  | 14 | 15 | 9 | 10 |
| Amounts (part by weight) | | | | |
| NR | 60 | 60 | 60 | 60 |
| BR | 40 | 40 | 40 | 40 |
| Carbon black | 20 | 20 | 20 | 20 |
| Silica (1) | 10 | 25 | — | 20 |
| Silica (2-3) | 15 | 5 | 20 | — |
| Silane coupling agent (2) | 2.1 | 2 | 2 | 1.2 |
| Zinc oxide | 3 | 3 | 3 | 3 |
| Stearic acid | 2 | 2 | 2 | 2 |
| Antioxidant | 2 | 2 | 2 | 2 |
| Wax | 2 | 2 | 2 | 2 |
| Sulfur (2) | 1.6 | 1.6 | 1.6 | 1.6 |
| Vulcanization accelerator (3) | 1.2 | 1.2 | 1.2 | 1.2 |
| Evaluation Results | | | | |
| Rolling resistance index | 101 | 103 | 100 | 104 |
| Steering stability | 6 | 6 | 6 | 5.5 |

The test tire (tire size: 195/65R15) of Example 13 was prepared by forming the unvulcanized rubber composition of Example 11 into a shape of a tread and the unvulcanized rubber composition of Example 14 into a shape of a sidewall, laminating them with other tire members on a tire molding machine and then press-vulcanizing. Evaluation was carried out assuming a rolling resistance index and wet skid performance index of the tire of Comparative Example 7 as 100 and steering stability of the tire of Comparative Example 7 as score 6.

The tire of Example 13 had a rolling resistance index of 110, a wet skid performance index of 101, and steering stability of 6.

According to the present invention, there can be provided a rubber composition capable of reducing rolling resistance, and improving abrasion resistance, wet skid performance, and steering stability by compounding specified amounts of specific two kinds of silica. The present invention can also provide a tire having a tread and/or a sidewall prepared using the rubber composition.

What is claimed is:

1. A tire having a tread and a sidewall, said tread and said sidewall having a rubber composition comprising a rubber component and a silica component, said silica component comprising not less than 10 parts by weight of a first silica having an average primary particle diameter of 25 to 50 nm and not less than 5 parts by weight of a second silica having an average primary particle diameter of 20 nm to less than 22 nm based on 100 parts by weight of a rubber component, wherein the total amount of the first silica and the second silica is 15 to 150 parts by weight, wherein both the first silica and the second silica, which are prepared by a wet process, are a silicic acid hydrate, and wherein the rubber component of the rubber composition for the sidewall consists of natural rubber and a butadiene rubber.

2. The tire of claim 1, wherein the average primary particle diameter of the first silica and the average primary particle diameter of the second silica satisfy the following general formula: (average primary particle diameter of the first silica/(average primary particle diameter of the second silica $\geq 1.4$.

3. The tire of claim 2, wherein a content of the first silica in the total silica is 10 to 35% by weight.

4. The tire of claim 2, wherein an amount of the first silica and an amount of the second silica satisfy the following general formula: (amount of the first silica)×0.03≦(amount of the second silica)≦(amount of the first silica)×14.

5. The tire of claim 1 wherein a content of the first silica in the total silica is 10 to 35% by weight.

6. The tire of claim 5, wherein an amount of the first silica and an amount of the second silica satisfy the following general formula: (amount of the first silica)×0.03≦(amount of the second silica)≦(amount of the first silica)×14.

7. The tire of claim 1, wherein an amount of the first silica and an amount of the second silica satisfy the following general formula: (amount of the first silica)×0.03<(amount of the second silica)<(amount of the first silica)×14.

* * * * *